US008473100B2

(12) United States Patent  (10) Patent No.: US 8,473,100 B2
Kalbavi et al.  (45) Date of Patent: Jun. 25, 2013

(54) SYSTEM AND METHOD FOR DYNAMICALLY SWITCHING CONVEYORS FOR ROBOTS

(75) Inventors: Ganesh Kalbavi, Rochester, MI (US); Gordon Geheb, Hartland, MI (US); Laxmi Musunur, Rochester Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 325 days.

(21) Appl. No.: 12/873,841

(22) Filed: Sep. 1, 2010

(65) Prior Publication Data

US 2011/0054675 A1  Mar. 3, 2011

Related U.S. Application Data

(63) Continuation-in-part of application No. 12/429,771, filed on Apr. 24, 2009, now Pat. No. 8,315,736.

(60) Provisional application No. 61/048,015, filed on Apr. 25, 2008, provisional application No. 61/238,739, filed on Sep. 1, 2009.

(51) Int. Cl.
*G06F 9/00* (2006.01)

(52) U.S. Cl.
USPC .......................................... 700/245; 718/105

(58) Field of Classification Search
USPC ................. 700/245, 230, 248–250, 253, 256, 700/257, 19, 20, 31, 95, 112, 214; 29/711; 414/285, 807; 718/105; 198/468.11, 468.6, 198/469.1, 470.1
See application file for complete search history.

(56) References Cited

U.S. PATENT DOCUMENTS

| 6,408,223 | B1 * | 6/2002 | Skyum et al. .................. 700/213 |
| 6,468,021 | B1 * | 10/2002 | Bonora et al. ................. 414/522 |
| 2007/0108109 | A1 * | 5/2007 | Erlandsson-Warvelin et al. ........................... 209/629 |

* cited by examiner

*Primary Examiner* — Dalena Tran
(74) *Attorney, Agent, or Firm* — Fraser Clemens Martin & Miller LLC; William J. Clemens

(57) ABSTRACT

A conveyor system and a method for dynamically switching an active work associated with a motion device, the system including a plurality of conveyors for moving at least one part, at least one production machine associated with at least one of the conveyors, at least one motion device to move the at least one part, a controller associated with the at least one motion device, wherein the controller is in data communication with the at least one production machine to receive a feedback data therefrom, the feedback data representing a state of the production machine, and a software system executed by the controller to dynamically and selectively control the at least one motion device in response to the feedback data.

20 Claims, 4 Drawing Sheets

SYSTEM AND METHOD FOR DYNAMICALLY SWITCHING CONVEYORS FOR ROBOTS

CROSS-REFERENCE TO RELATED APPLICATION

This application is a continuation-in-part of the co-pending U.S. patent application Ser. No. 12/429,771, filed on Apr. 24, 2009, which claims the benefit of U.S. provisional patent application Ser. No. 61/048,015, filed on Apr. 25, 2008, each of which is incorporated herein by reference in its entirety.

This application is entitled to the benefit of, and claims priority to, U.S. provisional patent application Ser. No. 61/238,739, filed Sep. 1, 2009, and U.S. provisional patent application Ser. No. 61/048,015, filed on Apr. 25, 2008, each of which is incorporated herein by reference in its entirety.

FIELD OF THE INVENTION

The present invention relates generally to robotics. More particularly, the invention is directed to a system and a method for dynamically switching an active work associated with a motion device.

BACKGROUND OF THE INVENTION

Robots typically have an active work or operational process associated therewith. For example, an active work associated with a robot can be the operation of picking a part from a moving conveyor and placing the part on another moving conveyor. In certain applications, the part comes from a "production machine". For example, the robots may pick cup cakes coming out of an oven on a moving conveyor, wherein the production machine is the oven.

As a further example, the robots may place or drop sliced bread on a conveyor that takes them to a wrapper, wherein the production machine is the wrapper.

The part or parts move along a conveyor from one conveyor station to the next conveyor station along a conveyor flow path. In the typical application in the industry, the robots pick the parts from one conveyor and drop the parts to another conveyor.

However, during a process, a "state change" may occur. For example, when one of the production machines (e.g. oven) becomes non-operational, the robots must switch to picking parts (e.g. cupcakes) from another conveyor that is fed with an operational production machine (e.g. oven).

Shortcomings of prior art:
1) There is no automatic switching to alternate conveyors when the operational state changes;
2) switching to alternate conveyors requires manual intervention to switch the robots; and
3) conventional switching methods cause significant production down-time.

SUMMARY OF THE INVENTION

Concordant and consistent with the present invention, a conveyor system and a method for dynamically switching an active work associated with a motion device overcomes the shortcomings of the prior art as follows:

Certain methods of the present invention provide a switching methodology based upon a plurality of load balance groups and the flow of parts through a plurality of conveyor stations in the load balance groups. Furthermore, when the robots switch conveyors, the parts are not sensed redundantly, thereby resulting in high efficiency in picking or dropping with minimal parts missed by the robots.

The system and methods of the present invention allow industries to maintain high productivity by continuously engaging the robots to pick or drop from conveyors that are operational instead of simply letting them wait for the non-operational conveyor to be operational again. Generally, production machines become non-operational at times, and it is highly desirable for the robots to be deployed in such a manner as to maintain or maximize throughput with the existing operational production machines.

In one embodiment, a conveyor system comprises: a plurality of conveyors for moving at least one part; at least one production machine associated with at least one of the conveyors; at least one motion device to move the at least one part; a controller associated with the at least one motion device, wherein the controller is in data communication with the at least one production machine to receive a feedback data therefrom, the feedback data representing a state of the production machine; and a software system executed by the controller to dynamically and selectively control the at least one motion device in response to the feedback data.

The invention also includes methods for dynamically switching an active work associated with a motion device.

One method comprises the steps of:
a) providing a plurality of conveyors for moving at least one part;
b) associating at least one production machine with at least one of the conveyors;
c) providing at least one motion device to move the at least one part;
d) detecting a state of the at least one production machine; and
e) selectively controlling the motion device to move the at least one part in response to the detected state of the at least one production machine.

Another method comprises the steps of:
a) defining a conveyor associated with each of a plurality of production machines;
b) defining a plurality of load balance groups associated with at least one conveyor, wherein each of the load balance groups includes at least one conveyor work area and at least one motion device associated with the conveyor work area;
c) activating a first one of the load balance groups to initiate a first active work of the at least one motion device associated;
d) detecting an operational state of at least one of the production machines;
e) cancelling a first active work of the at least one motion device in response to a change in the operational state of the at least one production machine; and
f) activating a second one of the load balance groups to initiate a second active work of the at least one motion device in response to the change in the operational state of the at least one production machine.

BRIEF DESCRIPTION OF THE DRAWINGS

The above, as well as other advantages of the present invention, will become readily apparent to those skilled in the art from the following detailed description of the preferred embodiment when considered in the light of the accompanying drawing in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
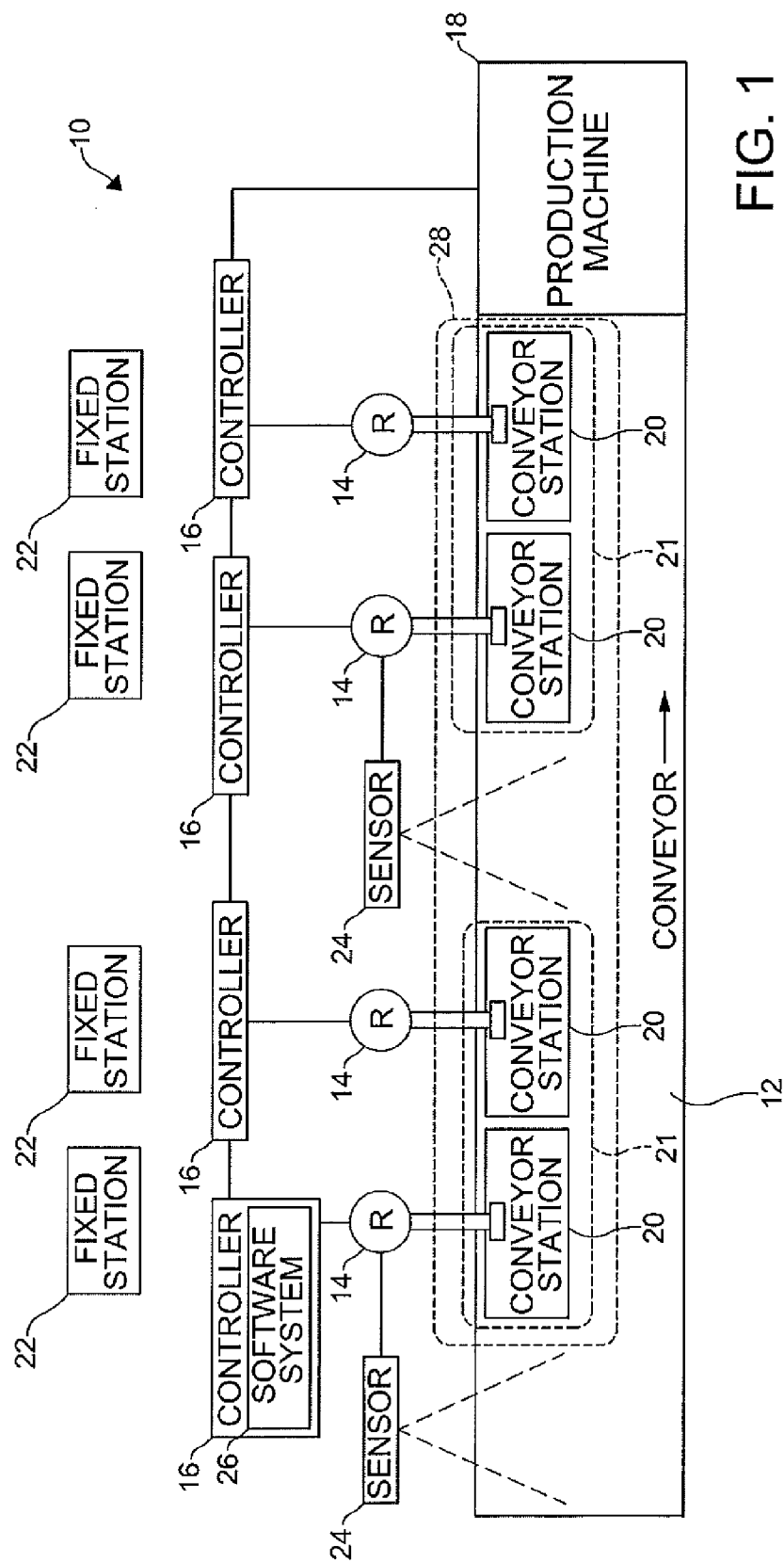
FIG. 1 is a schematic representation of a conveyor system according to an embodiment of the present invention.

FIG. 1 illustrates a conveyor system 10 according to an embodiment of the present invention. As shown, the conveyor system 10 includes at least one conveyor 12 (satisfactory results have been achieved with three or more conveyors 12), one or more motion devices 14 such as an industrial robot R, a controller 16 associated with each of the motion devices 14, and at least one production machine 18 associated with each of the at least one conveyor 12.

Each of the motion devices 14 is configured to selectively move a part to and from the at least one conveyor 12. However, it is understood that any active work (i.e. operational process, a series of robotic movements) can be associated with each of the motion devices 14. Specifically, a conveyor station 20 is defined (i.e. assigned) for each of the motion devices 14, wherein the conveyor station 20 is a portion of a work area 21 where the motion device 14 (e.g. robot) performs the active work (e.g. pick or the drop operation on various parts). As a non-limiting example, the motion devices 14 move parts between an associated one of the conveyors stations 20 defined on the at least one conveyer 12 and another one of the conveyor stations 20 defined on another conveyor (not shown). As a further non-limiting example the motion devices 14 move parts between an associated one of the conveyors stations 20 defined on the at least one conveyor 12 and a fixed station 22 (e.g. parts tray) where the motion device 14 (e.g. robot) performs the pick or the drop operation on various parts.

Each of the controllers 16 is adapted to dynamically control the function of the associated motion device 14. For example, each controller 16 defines a source of a pick operation (e.g. conveyor station 20, fixed station 22) and a destination of a drop operation (e.g. conveyor station 20, fixed station 22) for an associated one of the motion devices 14.

In certain embodiments, each of the controllers 16 is interconnected to another of the controllers 16 by a means of signal communication (e.g. Ethernet). In certain embodiments, at least one of the controllers 16 is in data communication with the production machine(s) 18 to enable a feedback data from the production machine 18 to be received and processed by at least one of the controllers 16. As such, an operational state of the production machine 18 can be tracked to determine a control of each of the motion devices 14.

In certain embodiments, the system 10 further includes a plurality of sensors 24 (e.g. cameras) arranged to provide a feedback data to the controllers 16 representing characteristics of the conveyor 12 or parts on the conveyor 12. It is understood that the feedback data from the production machine 18 and sensors 24 can be used to determine a control and/or configuration of each of the motion devices 14.

In certain embodiments, a software system 26 or instruction set is executed by at least one of the controllers 16 to dynamically and selectively control a conveyor switching of each of the motion devices 14. As a non-limiting example, the motion devices 14 that are normally picking and placing the parts between a pair of the conveyor stations 20, switch to picking and placing the parts between another pair of the conveyor stations 20. As a further non-limiting example, the software system 26 defines a plurality of load balance groups 28 to which each of the motion devices 14 belong, wherein each of the load balance groups 28 is an ordered configuration of a plurality of the conveyor stations 20 (or fixed stations 22) where the motion devices 14 (e.g. robot) perform the pick or the drop operation on various parts. It is understood that the load balance groups 28 may be configured to maximize the throughput of a robotic workcell in response to an operational state of one or more of the conveyors 12 and/or the production machines 18.

Figure 2:
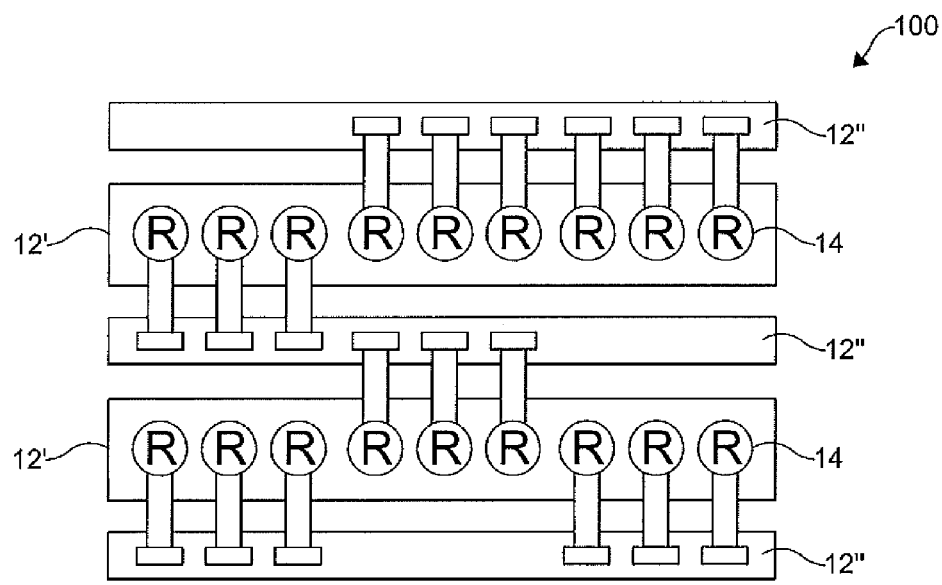
FIG. 2 is a schematic layout of a workcell according to an embodiment of the present invention, showing a first configuration.
Figure 3:
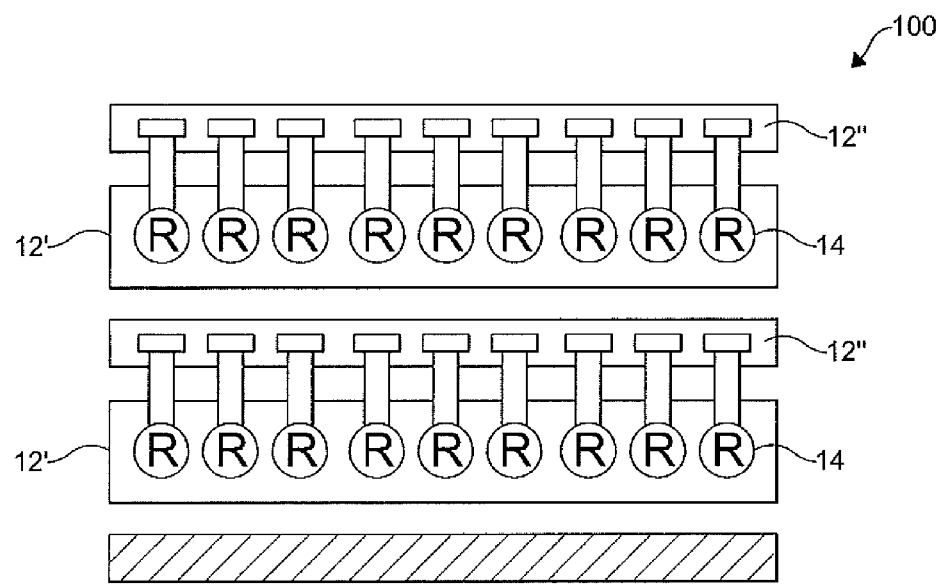
FIG. 3 is a schematic layout of the workcell of FIG. 2, showing a second configuration.

FIGS. 2-3 illustrate a sample layout of a workcell 100 according to an embodiment of the present invention. As shown in the workcell 100, a plurality of the motion devices 14 is disposed along a centerline of each of a pair of infeed conveyors 12'. Each of the infeed conveyors 12' is disposed between a pair of outfeed conveyors 12" (e.g. wrapper lines) so that the motion devices 14 can selectively pick from at least one of the infeed conveyors 12' and drop onto at least two of the outfeed conveyors 12'. As a non-limiting example each of the motion devices 14 may be arranged in a staggered configuration so that six of the motion devices 14 are placing on each of the outfeed conveyors 12", as illustrated in FIG. 2.

As a non-limiting example, when only two of three outfeed conveyors 12" are operational, nine of the motion devices 14 are configured to place/drop to each of the operational outfeed conveyors 12", as illustrated in FIG. 3. Specifically, the controllers 16 configure the load balance group associated with each of the motion devices 14 to switch the motion device 14/conveyor station 20 assignment in order to maximize throughput of the workcell 100.

In certain embodiments, a user configures a table of the conveyor stations 20 based upon the potential combination of operational states of the conveyors 12 and production machines 18. As a non-limiting example, a workcell with three of the conveyors 12, each of the conveyors 12 having an operational state and a non-operational state, generates a table of eight distinct states of the conveyors 12, as understood by one skilled in the art. However, any number of states can be defined for the conveyors 12 and production machines 18. As a further non-limiting example, the user can configure the conveyor stations 20 (and resulting assignment of the motion devices 14) to maximize a throughput for each of the states of the conveyors 12 (or production machines 18), wherein the associated configuration of the conveyor stations 20 for each of the states of the conveyors 12 is defined by one of the load balance groups 28.

In certain embodiments, each of the motion devices 14 utilizes one of two "drop" stations (e.g. conveyor station 20, fixed station 22) to drop parts based on the states of the conveyor 12 and the production machines 18. Specifically, the state of each of the conveyors 12 and/or the production machines 18 in the workcell 100 is communicated to each of the other controllers 16 in the workcell 100. In response to a change in the state of at least one of the conveyors 12 and/or the production machines 18, an alternative one of the load balance groups 28 is activated and the motion devices 14 are assigned to one of the conveyor stations 20 associated with the configuration table for the particular state of the conveyors 12 and production machines 18. Accordingly, the throughput of the workcell 100 is maximized for various states of any number of the conveyors 12 and the production machines 18.

Figure 4:
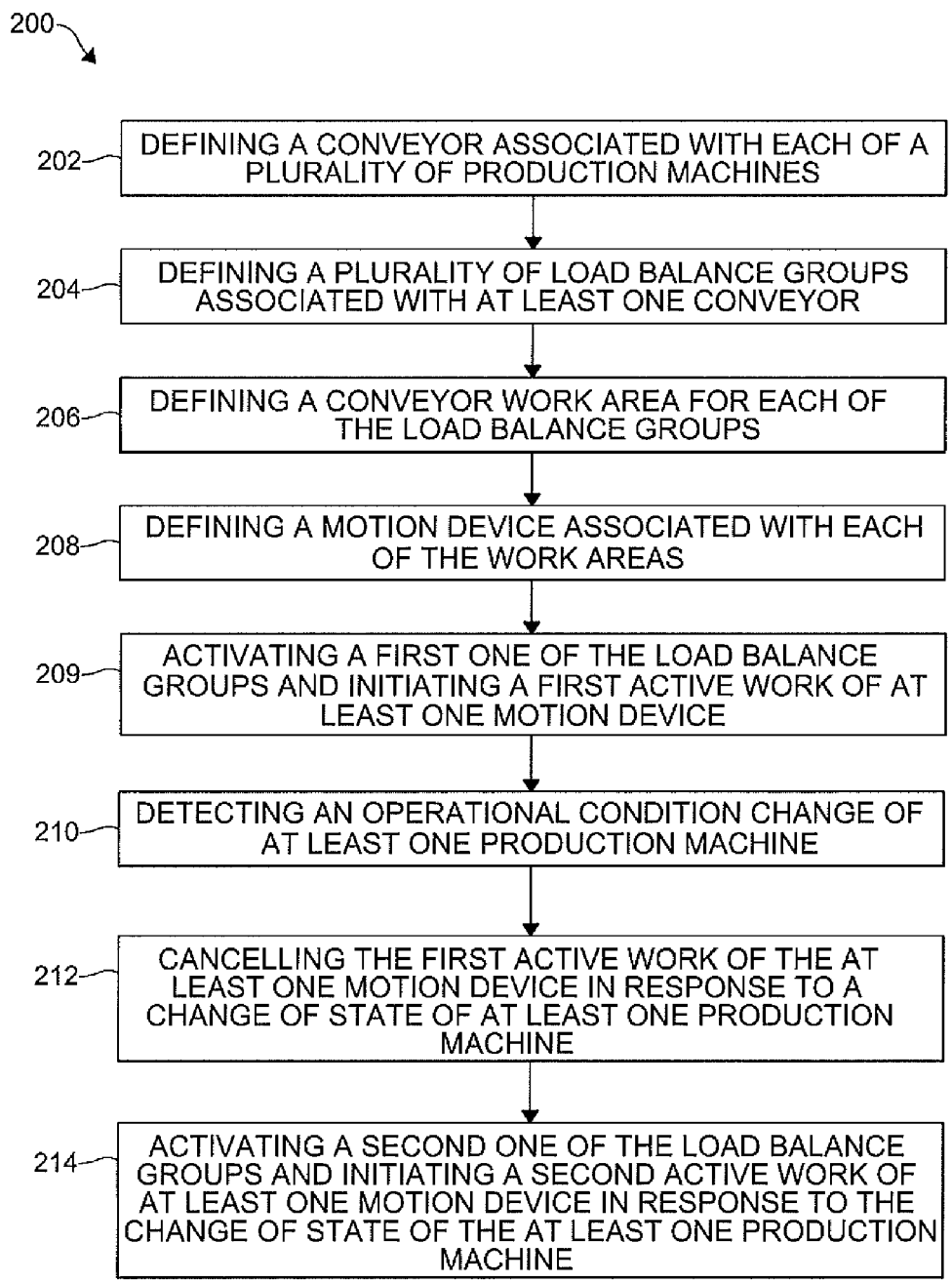
FIG. 4 is a schematic flow diagram of a method for dynamically switching an active work associated with a motion device according to an embodiment of the present invention.

As an illustrative example, FIG. 4 includes a method 200 of controlling a plurality of the motion devices 14 working with one or more of the conveyors 12 and performing pick and place operations. In step 202 at least one of the conveyors 12 is associated with each of the production machines 18. In step 204, at least one load balance group 28 is associated with each of the conveyors 12. In step 206, a work area 21 is defined for each of the load balance groups 28. As a non-limiting example, a plurality of the conveyor stations 20 are defined to represent the overall work area 21 associated with each of the load balance groups 28. In step 208, each of the motion devices 14 that belong to each of the work areas 21 (e.g. conveyor stations 20) is defined. In step 209, a first one of the load balance groups 28 is activated and a first active work of the motion devices 14 associated with the first one of load balance group 28 is initiated.

In step 210, while the system 10 is running, a feedback data generated by the production machines 18 (and/or the sensors 24) is transmitted to the controllers 16 to detect the operational state (operational or not operational) of each of the production machines 18 and associated conveyors 12 in the workcell. In step 212, the current active work (e.g. motions, returning part to queue) is cancelled for the motion devices 14 impacted by a change in the operational state of at least one of the conveyors 12 and the production machines 18. In Step 214, the controllers 16 configure the motion devices 14 based upon an alternative configuration of conveyor stations 20 (e.g. activating another of the load balance groups 28) and initiate an active work (e.g. motions, getting new part allocations) in response to a change in the operational state of at least one of the production machines 18 and associated conveyors 12. It is understood that activating another one or a second one of the load balance groups 28 (including the associated conveyor stations 20) can include a dynamic re-configuration of the a first one of the load balance groups 28 (defined in step 209) to enable a different set of associated conveyor stations 20 than in the previous state of production machines 18. It is further understood that the load balance groups 28 can include all the conveyor stations 20 for the motion devices 14 to serve both the operational and non-operational states of the production machines 18.

Figure 5:
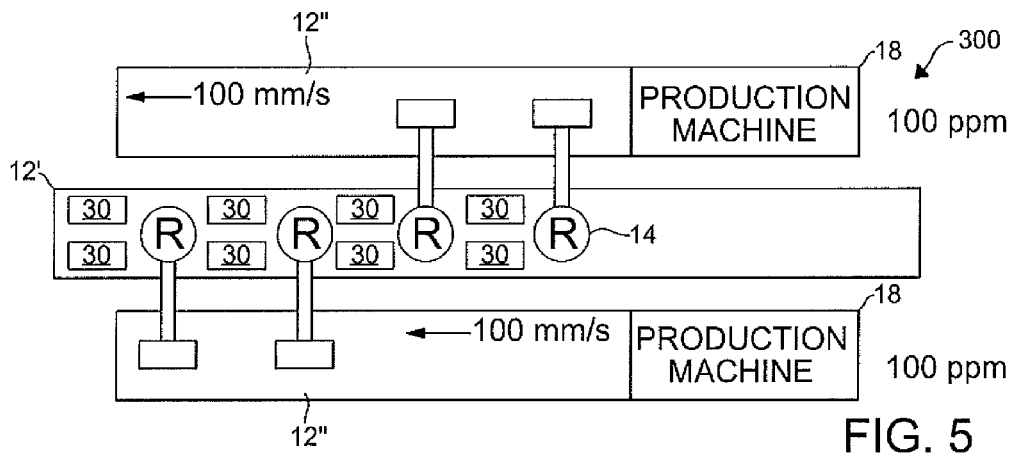
FIG. 5 is a schematic layout of a workcell according to an embodiment of the present invention, showing a first load balance group configuration.
Figure 6:
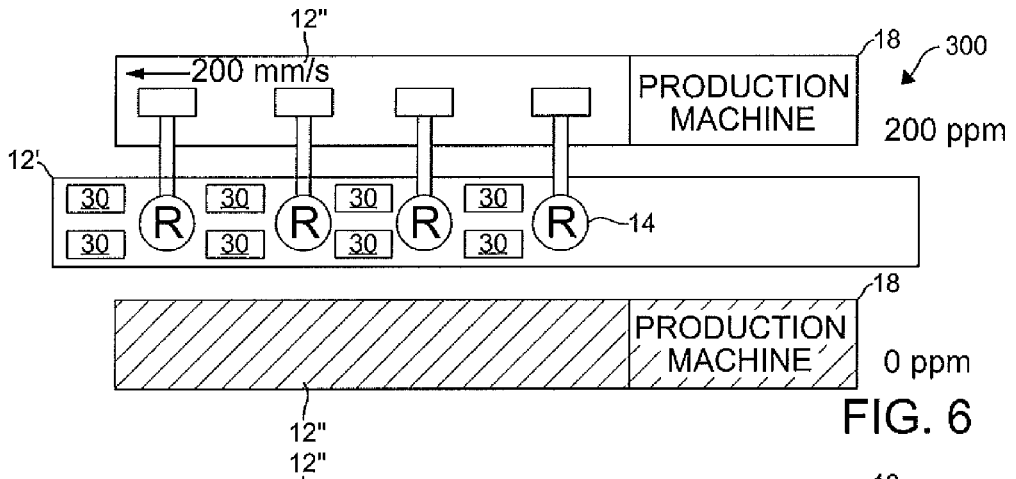
FIG. 6 is a schematic layout of the workcell of FIG. 5, showing a second load balance group configuration.
Figure 7:
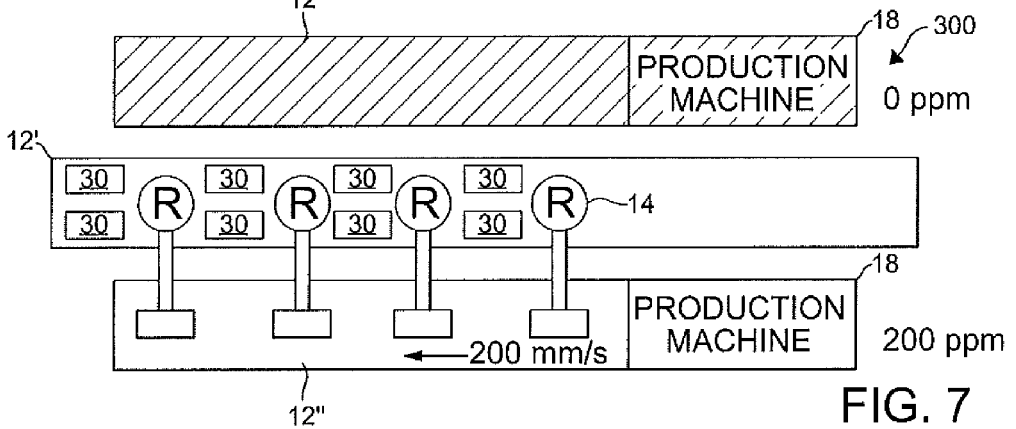
FIG. 7 is a schematic layout of the workcell of FIG. 5, showing a third load balance group configuration.

FIGS. 5-7 provide an illustrative example of an operation of the conveyor system 10 and the methodologies described herein. Each of FIGS. 5-7 illustrates a sample layout of a workcell 300 similar to the workcell 100 except as described below. As shown, the workcell 300 includes one of the infeed conveyors 12' disposed adjacent a pair of the outfeed conveyors 12", wherein one of the production machines 18 is associated with each of the outfeed conveyors 12" and a plurality of the motion devices 14 are disposed along the infeed conveyor 12' to pick parts 30 from a select one of the outfeed conveyors 12" and place parts 30 on the infeed conveyor 12' (or pick parts 30 from the infeed conveyor 12' and place parts 30 on a selected one of the outfeed conveyors 12"). As a non-limiting example, each of the motion devices 14 belongs to three pre-defined load balance groups 28.

FIG. 5 illustrates a first configuration of the workcell 300 embodying one of the three load balance groups 28 defined for the workcell 300. As shown, each of the production machines 18 has an operational state. Two of the motion devices 14 are serving each of the outfeed conveyors 12" which are fed from a respective one of the production machines 18. As a non-limiting example, each of the production machines 18 is producing 100 parts per minute (PPM) and each of the outfeed conveyors 12" is moving at a rate of 100 mm/s (allowing sufficient time for two of the motion devices 14 to pick from each of the outfeed conveyors 12" and place 100 parts per minute to the infeed conveyor 12').

FIG. 6 illustrates a second configuration of the workcell 300 embodying a second of the three load balance groups 28 defined for the workcell 300. As shown, one of the production machines 18 is operational and the other of the production machines 18 is non-operational. Accordingly, the second of load balance groups 28 configures four of the motion devices 14 to serve a single one of outfeed conveyors 12", which is fed from an operational one of the production machines 18 (in this case the "top" conveyor 12" and the associated production machine 18). As a non-limiting example, the operational one of the production machines 18 is configured to produce 200 parts per minute (PPM) and an operational one of the outfeed conveyors 12", associated with the operational one of the production machines 18, is moving at a rate of 200 mm/s (allowing sufficient time for four of the motion devices 14 to pick from the outfeed conveyor 12" and place 200 parts per minute to the infeed conveyor 12').

FIG. 7 illustrates a third configuration of the workcell 300 embodying a third of the three load balance groups 28 defined for the workcell 300. As shown, one of the production machines 18 is operational and the other of the production machines 18 is non-operational. Accordingly, the third of load balance groups 28 configures four of the motion devices 14 to serve a single one of the outfeed conveyors 12", which is fed from an operational one of the production machines 18 (in this case the "bottom" conveyor 12" and the associated production machine 18). As a non-limiting example, the operational one of the productions machines 18 is configured to produce 200 parts per minute (PPM) and an operational one of the outfeed conveyors 12" associated with the operational one of the production machines 18 is moving at a rate of 200 mm/s (allowing sufficient time for four of the motion devices 14 to pick from the outfeed conveyor 12" and place 200 parts per minute to the infeed conveyor 12').

Accordingly, each of the load balance groups 28 is defined to configure the conveyor stations 20 and associated motion devices 14 based upon a state of at least one of the conveyers 12 and the production machines 18 in order to maximize a throughput of the workcell 300.

The methods of the present invention provide a switching methodology that is tied to a plurality of the pre-determined load balance groups 28 and the flow of parts 30 through conveyor stations 20 in the load balance groups 28. Furthermore, when the motion devices 14 switch from one of the conveyors 12 to another, the parts 30 that are served by the motion devices 14 are not sensed redundantly. This results in high efficiency in picking or dropping with minimal parts missed by the motion devices.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for dynamically switching an active work associated with a motion device, the method comprising the steps of:
   a) providing a plurality of conveyors for moving at least one part;
   b) associating at least one production machine with at least one of the conveyors;
   c) providing at least one motion device to move the at least one part at least one of to and from the at least one conveyor;
   d) detecting a state of the at least one production machine by receiving feedback data representing the state with a controller, the feedback data being generated by the at least one production machine; and
   e) selectively controlling the motion device with the controller to move the at least one part in response to the detected state of the at least one production machine.

2. The method according to claim 1, wherein the system includes at least one infeed conveyor and at least one outfeed conveyor.

3. The method according to claim 1, wherein the at least one motion device is a robot.

4. The method according to claim 1, wherein the motion device is selectively controlled to move the at least one part from one of the conveyors to a pre-determined location.

5. The method according to claim 1, wherein the motion device is selectively controlled to move the at least one part from one of the conveyors to another one of the conveyors.

6. The method according to claim 1, wherein the state of the production machine is one of operational and non-operational.

7. The method according to claim 6, wherein the motion device is selectively controlled to move the at least one part from one of the conveyors associated with the at least one production machine having an operational state.

8. The method according to claim 6, further comprising the step of repeating steps d) and e) in real-time.

9. A method for dynamically switching an active work associated with a motion device, the method comprising the steps of:
   a) defining a conveyor associated with each of a plurality of production machines;
   b) defining a plurality of load balance groups associated with at least one conveyor, wherein each of the load balance groups includes at least one conveyor work area and at least one motion device associated with the conveyor work area;
   c) activating a first one of the load balance groups by a controller to initiate a first active work of the at least one motion device associated;
   d) detecting an operational state of at least one of the production machines by receiving feedback data representing the operational state with the controller, the feedback data being generated by the at least one production machine;
   e) cancelling the first active work of the at least one motion device by the controller in response to a change in the operational state of the at least one production machine; and
   f) activating a second one of the load balance groups by the controller to initiate a second active work of the at least one motion device in response to the change in the operational state of the at least one production machine.

10. The method according to claim 9, wherein the at least one conveyor work area is defined by a plurality of conveyor stations.

11. The method according to claim 10, wherein at least one of the motion devices is assigned to at least one of the conveyor stations of each of the load balance groups.

12. The method according to claim 9, wherein the at least one motion device is a robot.

13. The method according to claim 9, wherein the operational state of the production machine is one of operational and non-operational.

14. An apparatus for dynamically switching an active work associated with a motion device, comprising:
   a plurality of conveyors for moving at least one part;
   at least one production machine associated with at least one of the conveyors;
   at least one motion device to move the at least one part;
   a controller associated with the at least one motion device, wherein the controller is in data communication with the at least one production machine to receive a feedback data therefrom, the feedback data representing a detected state of the at least one production machine; and
   a software system executed by the controller to dynamically and selectively control the at least one motion device to move the at least one part in response to the detected state of the at least one production machine.

15. The apparatus according to claim 14 wherein the plurality of conveyors includes at least one infeed conveyor and at least one outfeed conveyor.

16. The apparatus according to claim 14 wherein the at least one motion device is a robot.

17. The apparatus according to claim 14 wherein the at least one motion device is selectively controlled to move the at least one part from one of the conveyors to a pre-determined location.

18. The apparatus according to claim 14 wherein the at least one motion device is selectively controlled to move the at least one part from one of the conveyors to another one of the conveyors.

19. The apparatus according to claim 14 wherein the detected state of the at least one production machine is one of operational and non-operational.

20. The apparatus according to claim 19 wherein the at least one motion device is selectively controlled to move the at least one part from the at least one of the conveyors associated with the at least one production machine having an operational state.

* * * * *